United States Patent [19]

Ebbing

[11] Patent Number: 5,219,007
[45] Date of Patent: Jun. 15, 1993

[54] METHOD AND APPARATUS FOR REDUCING PARTICULATE GENERATION CAUSED BY DOOR OR COVER FLEXING ON HIGH VACUUM EQUIPMENT

[75] Inventor: Peter Ebbing, Los Altos, Calif.

[73] Assignee: Applied Materials, Inc., Santa Clara, Calif.

[21] Appl. No.: 802,936

[22] Filed: Dec. 6, 1991

Related U.S. Application Data

[62] Division of Ser. No. 568,394, Aug. 16, 1990, abandoned.

[51] Int. Cl.⁵ .............................................. B65B 31/00
[52] U.S. Cl. .......................................... 141/7; 141/8; 220/521; 220/259; 220/327
[58] Field of Search ............... 220/521, 522, 526, 254, 220/DIG. 17, 259, 327; 215/307, 308, 346; 206/524.8; 141/7, 8, 54, 57, 59

[56] References Cited

U.S. PATENT DOCUMENTS 2,387,978 10/1945 Casey ................................. 220/521
4,315,579 2/1982 Martin, Jr. .......................... 220/254

Primary Examiner—Henry J. Recla
Assistant Examiner—David J. Walczak
Attorney, Agent, or Firm—Birgit E. Morris

[57] ABSTRACT

An inner lid is attached to a vacuum chamber, covering an inner region of the vacuum chamber. An outer lid, also attached to the vacuum chamber, covers the inner lid, leaving a region between the inner lid and the outer lid. A gas conduit allows gas to flow between the inner region of the vacuum chamber and the region between the inner lid and the outer lid. A filter is placed in or immediately outside the gas conduit to prevent particles from entering the inner region of the vacuum chamber from the region between the inner lid and the outer lid. Since the pressure is the same on the top and bottom of the inner lid, the inner lid does not flex and thus does not rub against the vacuum chamber when the vacuum chamber is pumped down or vented up.

6 Claims, 2 Drawing Sheets

1

METHOD AND APPARATUS FOR REDUCING PARTICULATE GENERATION CAUSED BY DOOR OR COVER FLEXING ON HIGH VACUUM EQUIPMENT

This application is a division of Ser. No. 07/568,394, filed Aug. 16, 1990 now abandoned.

BACKGROUND

The present invention relates to the design of covers and doors for high vacuum equipment to reduce particulate generation which is caused by flexing.

High vacuum equipment, for example, vacuum chambers such as processing chambers and load lock chambers used in the processing of integrated circuits, are frequently pumped down and vented up. Due to the constant change in pressure, a door or a cover to a chamber may be caused to flex. Unless the door or cover is sufficiently stiff and bolted down, the flexing of the door or cover will result in the door or cover rubbing at the location where the door or cover touches the chamber walls. Such rubbing generates particles which can enter the chamber as contaminants. Particulates also may be generated, to a lesser degree, by the inward flexing surface of the cover.

SUMMARY OF THE INVENTION

In accordance with the preferred embodiments of the present invention, a method and apparatus are presented for covering an inner region of a vacuum chamber. An inner lid, attached to the vacuum chamber, covers the inner region. An outer lid, also attached to the vacuum chamber, covers the inner lid, leaving a region between the inner lid and the outer lid. A gas conduit allows gas to flow between the inner region of the vacuum chamber and the region between the inner lid and the outer lid. A filter is placed in or immediately outside the gas conduit to prevent particles from entering the inner region of the vacuum chamber from the region between the inner lid and the outer lid. Since the pressure is the same on the top and bottom of the inner lid, the inner lid does not flex and does not rub against the vacuum chamber when the vacuum chamber is pumped down or vented up.

In an alternate embodiment of the preferred embodiment of the present invention, an inner lid, attached to the vacuum chamber, covers the inner region. An outer lid, also attached to the vacuum chamber, covers the inner lid, leaving a region between the inner lid and the outer lid. A first gas conduit allows the inner region to be pumped down or vented up. A second gas conduit allows the region between the inner lid and the outer lid to be pumped down or vented up. However, while being pumped down or vented up, the inner region of the vacuum chamber and the region between the inner lid and the outer lid are kept at the same relative pressure. Since the pressure is the same on the top and bottom of the inner lid, the inner lid does not flex and does not rub against the vacuum chamber when the vacuum chamber is pumped down or vented up.

DESCRIPTION OF THE PREFERRED EMBODIMENT

Figure 1:
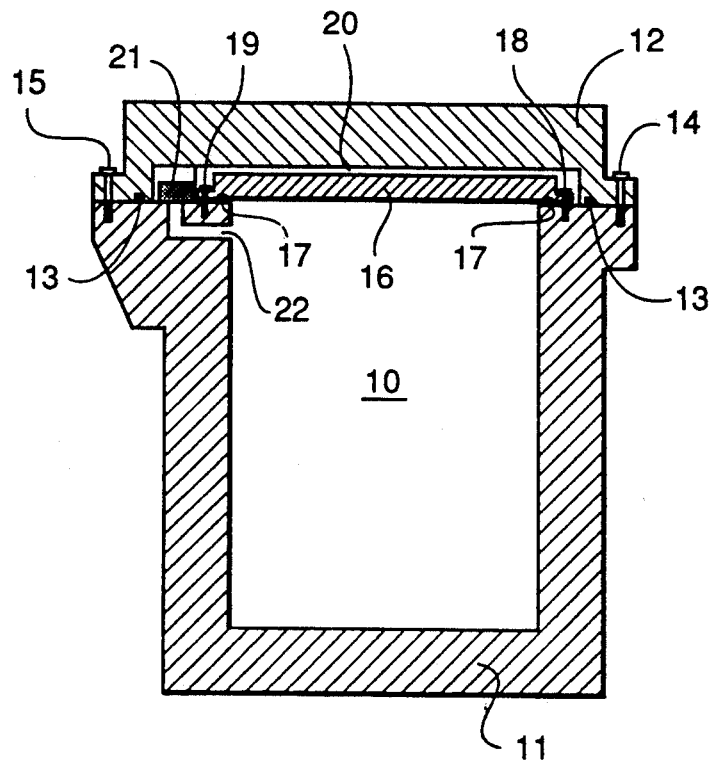
FIG. 1 is a simplified cross-sectional view of a vacuum chamber with a cover designed according to a preferred embodiment of the present invention.

In FIG. 1 is shown a simplified cross-sectional view of a vacuum chamber 11. During pump down, a vacuum is introduced into an inner region 10 of vacuum chamber 11.

An inner cover 16 is secured to vacuum chamber 11, for example, by screws including a screw 18 and a screw 19. A seal 17 prevents leakage around inner cover 16. An outer cover 12 is secured to vacuum chamber 11, for example, by screws including a screw 14 and a screw 15. A seal 13 prevents leakage around outer cover 12.

A conduit 22 connects inner region 10 to a region 20 between inner cover 16 and outer cover 12. Gas flowing through conduit 22 keeps region 20 and inner region 10 at the same pressure. The volume of region 20 is minimized to limit the volume of gas that needs to be removed from inner region 10 during pump down.

Since the pressure is the same on the top and bottom of inner cover 16, inner cover 16 does not flex and thus does not rub against chamber 11 when chamber 11 is pumped down or vented up. A filter 21 prevents particles, which may be generated by rubbing of outer cover 12 against chamber 11 resulting from flexing of outer cover 12, from entering inner region 10.

Figure 2:
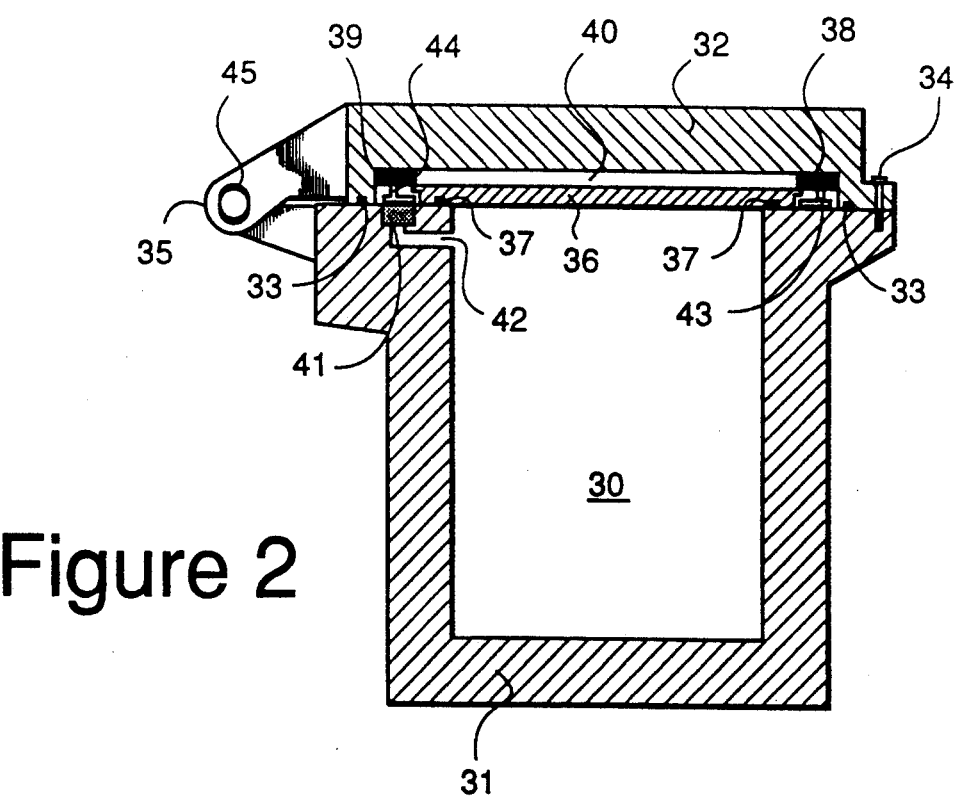
FIG. 2 is a simplified cross-sectional view of a vacuum chamber with a door designed according to an alternate preferred embodiment of the present invention.

One of numerous alternate embodiments of the present invention is illustrated by the simplified cross-sectional view of a vacuum chamber shown in FIG. 2.

In FIG. 2, an inner cover 36 is secured to vacuum chamber 31, for example, by restraints including a spring 38 on a guide 43 and a spring 39 on a guide 44. A seal 37 prevents leakage around inner cover 36. An outer door 32 on a hinge 35 is secured to vacuum chamber 31, for example, by screws including a screw 34. A seal 33 prevents leakage around outer door 32. When outer door 32 is opened, guide 43 and guide 44 capture inner cover 36, causing inner cover 36 to open with outer door 32.

In order to insure that outer door 32 seals tightly to vacuum chamber 31, it is recommended that hinge 35 have some play, as illustrated by oblong shaped hole 45. This allows outer door 32 to fully seat against vacuum chamber 31 when a vacuum is introduced into inner region 30.

A conduit 42 connects an inner region 30 to a region 40 between inner cover 36 and outer door 32. Gas flowing through conduit 42 keeps region 40 and inner region 30 at the same pressure. The volume of region 40 is minimized to limit the volume of gas that needs to be removed from inner region 30 during pump down.

Since the pressure is the same on the top and bottom of inner cover 36, inner cover 36 does not flex and thus does not rub against chamber 31 when chamber 31 is pumped down or vented up. A filter 41 prevents particles, which may be generated by rubbing of outer door 32 against chamber 31 resulting from flexing of outer door 32, from entering inner region 30.

Figure 3:
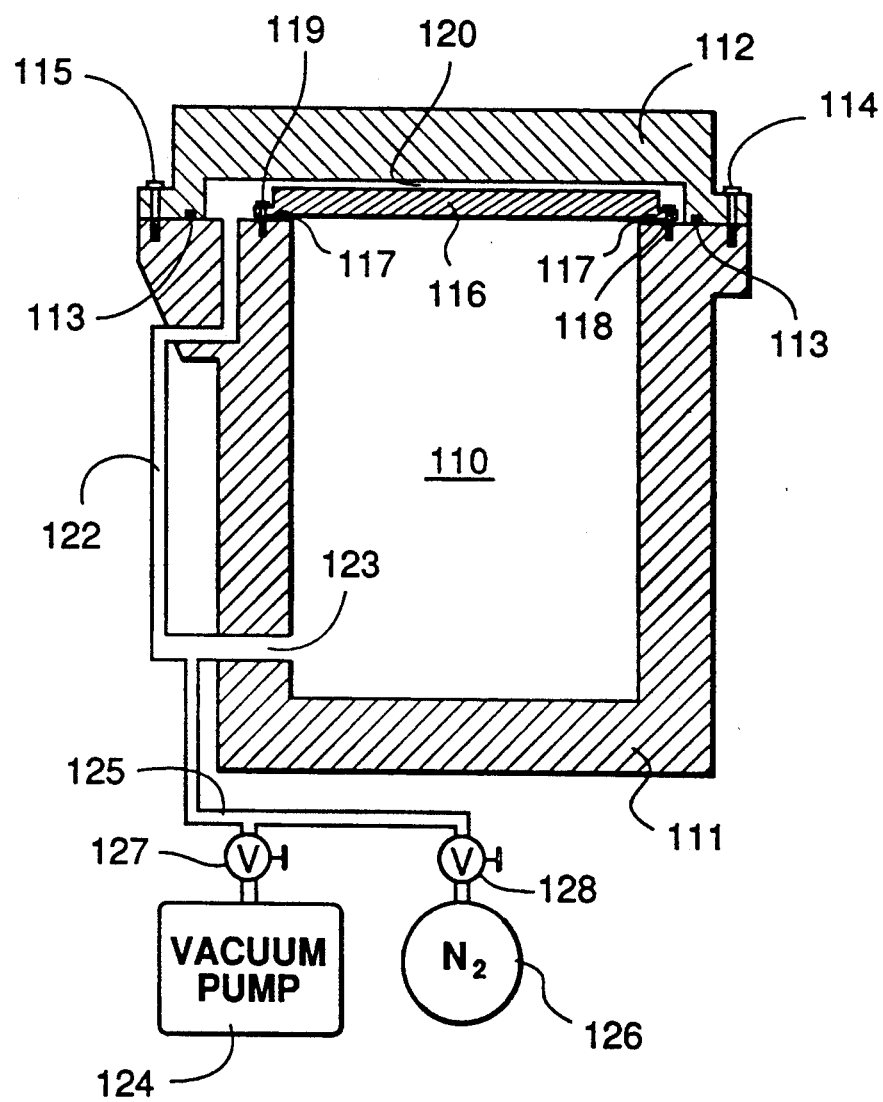
FIG. 3 is a simplified cross-sectional view of a vacuum chamber according to an another alternate preferred embodiment of the present invention.

Another alternate embodiment of the present invention is shown in FIG. 3. In FIG. 3, an inner cover 116 is secured to vacuum chamber 111, for example, by screws including a screw 118 and a screw 119. A seal 117 prevents leakage around inner cover 116. An outer cover 112 is secured to vacuum chamber 111, for example, by screws including a screw 114 and a screw 115. A seal 113 prevents leakage around outer cover 112.

A conduit 123 connected to a conduit 125 connects inner region 110 to a vacuum pump 124 and to a nitrogen tank 128. A conduit 122 connected to conduit 125 connects a region 120 between inner cover 116 and outer cover 112 to vacuum pump 124 and to nitrogen tank 128. Vacuum pump 124 pumps down inner region 110 and region 120 sot hat region 120 and inner region 110 are at the same relative pressure. During the pump down process and while inner region 110 and region 120 are pumped down, a valve 128 isolates nitrogen chamber 128 from conduit 125. The volume of region 120 is minimized to limit the volume of gas that needs to be removed during pump down.

Since vacuum pump 124 keeps pressure on the top and bottom of inner cover 116 at the same relative pressure, inner cover 116 does not flex and does not rub against chamber 111 when chamber 111 is pumped down.

When inner region 110 and region 120 are vented up, nitrogen is slowly released into conduit 125 from nitrogen chamber 126. Region 120 and inner region 110 are vented up while remaining at the same relative pressure. During the vent up process a valve 127 isolates vacuum pump 124 from conduit 125. During vent up, the pressure on the top and bottom of inner cover 116 is kept at the same relative pressure and inner cover 116 does not flex and does not rub against chamber 111 when chamber 111 is vented. During pump down and vent up the system should typically maintain the pressure differential across inner cover 116 below 200 Millitorr.

I claim:

1. In a vacuum chamber having an opening and a seal for said opening, the improvement wherein said seal comprises:
   (a) a first non-perforated cover fastened to said chamber and covering said opening;
   (b) a second cover fastened to said chamber and covering said first cover leaving a space between said first and second covers; and
   (c) a conduit between said chamber and said space between said first and second covers.

2. A vacuum chamber according to claim 1 wherein a filter is mounted between said space between said first and second covers and said chamber.

3. A vacuum chamber according to claim 2 wherein said filter is mounted in the space between said first and second covers.

4. A vacuum chamber according to claim 2 wherein said filter is mounted in said conduit.

5. A vacuum chamber according to claim 1 wherein an inert gas source is coupled to said vacuum chamber.

6. A vacuum chamber according to claim 5 wherein an inert gas source is coupled to said vacuum chamber and to said space between said first and second covers.

* * * * *